United States Patent [19]

Ishikawa et al.

[11] 4,296,494
[45] Oct. 20, 1981

[54] ERROR CORRECTION AND DETECTION SYSTEMS

[75] Inventors: Sakou Ishikawa; Yutaka Watanabe; Katsuro Wakai, all of Hadano, Japan

[73] Assignee: Hitachi, Ltd., Tokyo, Japan

[21] Appl. No.: 84,452

[22] Filed: Oct. 12, 1979

[30] Foreign Application Priority Data

Feb. 7, 1979 [JP] Japan .................................. 54-12275

[51] Int. Cl.³ ............................................. G06F 11/10
[52] U.S. Cl. .......................................... 371/13; 371/38
[58] Field of Search ..................................... 371/13, 38

[56] References Cited

U.S. PATENT DOCUMENTS

| | | | |
|---|---|---|---|
| 3,273,120 | 9/1966 | Dustin et al. | 371/13 |
| 3,949,208 | 4/1976 | Carter | 371/38 |
| 4,037,091 | 7/1977 | Beuscher | 371/13 |
| 4,045,779 | 8/1977 | Markle | 371/13 |
| 4,175,692 | 11/1979 | Watanabe | 371/38 |

OTHER PUBLICATIONS

Bachman and Dobrzynski, Multiple Error Correction, IBM Technical Disclosure Bulletin, vol. 13, No. 8, Jan. 1971, p. 2190.

*Primary Examiner*—Charles E. Atkinson
*Attorney, Agent, or Firm*—Craig and Antonelli

[57] ABSTRACT

In a system which employs SEC-DED codes constituted by data bits added to redundant bits and is capable of detecting and correcting a single bit error while detecting a double or more bit error, detection is made on miscorrection ascribable to a triple bit error. When a single bit error is detected by an error detecting and correcting circuit in the SEC-DED code read out from a memory, all the corrected data bits are inverted in state and rewritten in the memory after having been added to new redundant bits. Subsequently, the data bits together with the redundant bits are read out from the memory and supplied to the error detecting and correcting circuit. The data bits obtained from the error detecting and correcting circuit are compared with the corrected and inverted data bits available before being written in the memory, to thereby determine the presence of an error encompassing more than (m+1) bits on the basis of the result of comparison.

10 Claims, 2 Drawing Figures

ERROR CORRECTION AND DETECTION SYSTEMS

BACKGROUND OF THE INVENTION

The present invention relates to an error correction and detection system for a memory or storage device employed in an electronic computer or the like. In more particular, the invention relates to an apparatus for detecting miscorrection in the error correcting and detecting system.

As an attempt to increase the reliability of memory devices, there has been used in practice an error detecting and correcting system in which so-called Hamming codes are adopted for allowing a single bit error to be detected and corrected and a double bit error to be detected. Such code is herein referred to as an SEC-DED code as an abridgement form in capital letters of Single bit Error Correction - Double bit Error Detection, although the same code is sometimes referred to simply as an ECC code, an abridgement of Error Check and Correction. The principle of SEC-DED codes are fully discussed by R. W. Hamming in his article under the title "Error Detecting and Error Correcting Codes" in "The Bell System Technical Journal", Vol. XXVI, No. 2, pp. 147-160, April 1950 and also well known from U.S. Reissued Pat. No. 23601 to R. W. Hamming et al under the title "ERROR-DETECTING AND CORRECTING SYSTEM".

The principle of an SEC-DED code will be briefly reviewed. When the SEC-DED code is composed of n inherent information (data) bits in combination with k' redundant bits for error correction, the following conditions must be satisfied in order to identify the position at which the correction is required (one of n+k' positions) and detect the presence or absence of error. Namely, $$2^{k'} - (n + k' + 1) \geq 0 \qquad (1)$$

If one additional redundant bit is used for detecting the double bit error, the total number k of the redundant bits is equal to k'+1. Accordingly, the expression (1) can be rewritten as follows:

$$2^{k-1} - (n+k) \geq 0 \qquad (2)$$

Hence, it is apparent that the total number k of the redundant bits will amount to 8 bits for data of 64 bits (n=64).

In a practical system operating on the basis of the above principle, write-in data of n bits is supplied to a SEC-DED code generator circuit, at which the write-in data is added to k redundant bits, whereby a write-in SEC-DED code is produced. The number of bits of this code is thus equal to n+k. The coded information containing the write-in data may then be written in a memory device. For the reading-out operation, the information as read out from the memory is a read-out SEC-DED code containing the data. The read-out information code is fed to a SEC-DED circuit in which correction of a single bit error as well as detection of double bit error are made. If a single bit error has been produced within the memory, the SEC-DED circuit detects such a single bit error, to thereby switch on a single bit error detection line for signalling an alarm signal to an operator and at the same time to correct the error bit to a correct value. When a multi-bit error greater than a double bit error, inclusive, has been produced, detection of the error is made in a similar manner and an associated multi-bit error detection line is turned on to signal an alarm. In this way, an n-bit output from the SEC-DED circuit can be utilized as correct data when no error is produced within the memory or the error is a single bit.

On the other hand, when a double or more-bit error has been produced, a read-out data output from the SEC-DED circuit represents false information. For an error of 2 bits, an alarm can be produced with a probability of 100%. For an error of more than 3 bits, an alarm may be produced with a certain degree of reliability. In other words, although the generation of a double bit error can be detected without fail, perfect detection can not be expected for a multi-bit error containing 3 or more bits. Such a situation is also described by Y. Hsiao in his article "A Class of Optimal Minimum Odd-weight-column SEC-DED Codes" of "IBM J. RES. DEVELOP", July 1970, pp. 395-401 (refer in particular to page 398, right column, lines 35 to 42). In such a case, the triple bit error is determined as if a single bit error were produced, whereby a miscorrection is performed. The probability of mistaking the triple bit error for a single bit error is considered generally on the order of 50 to 75%. Alternatively saying, more than a half the miscorrections are processed as corrections. This is of course intolerable in a computer imposed with high reliability and accuracy requirements.

To deal with such an inconvenience, M. Y. Hsiao has introduced in the article referred to above an encoding method according to which the probability of miscorrection of the triple bit error can be reduced to a more reasonable degree.

U.S. Pat. No. 3,436,734 issued to James H. Pomerene et al titled "ERROR CORRECTING AND REPAIRABLE DATA PROCESSING STORAGE SYSTEM" discloses a method of packing the individual bits forming words in different packages with an attempt to reduce the probability of occurrence of a triple bit error.

Further, U.S. Pat. No. 3,582,878 to Douglas C. Bossen et al titled "MULTIPLE RANDOM ERROR CORRECTING SYSTEM", U.S. Pat. No. 3,656,107 to Mu-Yue Hsiao et al entitled "AUTOMATIC DOUBLE ERROR DETECTION AND CORRECTION APPARATUS", as well as U.S. Pat. No. 3,893,071 to Douglas C. Bossen et al entitled "MULTI-LEVEL ERROR CORRECTION SYSTEM FOR HIGH DENSITY MEMORY" disclose systems in which the number k of redundant bits employed usually in SEC-DED circuits is increased (e.g. 9 or more redundant bits for 64 data bits), to thereby allow the double or more bit error not only to be detected but also to be corrected.

Although these known methods are of great significance for enhancing reliability, it is yet impossible to eliminate completely miscorrections.

As an approach to solve the problem described above, Y. Watanabe, one of the inventors of the present application, has proposed in U.S. patent application Ser. No. 836,089 filed Dec. 22, 1977 under the title "ERROR CORRECTION AND DETECTION SYSTEMS" and now U.S. Pat. No. 4,175,692, a system which is capable of detecting with a high certainty that a triple bit error has been miscorrected as a single bit error. As another approach, the same inventor has also proposed in Japanese Laid-Open Patent Application No. 81035/1978 a system which is capable of detecting the fact that a triple bit error has been miscorrected as a single bit error. Briefly reviewing the last mentioned proposal, when a single bit error is detected and corrected in an SEC-DED circuit, the polarity of all data bits after the correction is inverted. Subsequently, redundant bits are produced from the corrected data bits of the inverted state and written again in a memory device. Then, the data bits together with the redundant bits are read out to be supplied to the SED-DED circuit, whereby the repeated detection of error is interpreted as the presence of a triple bit error. The error correcting and detecting system disclosed in Japanese Laid-Open Patent Application recited is completely free of such problem that the triple bit error would be processed as if it were a single bit error, and thus involves no confusion in the succeeding arithmetic processings.

However, the system briefed just above is disadvantageous in that a single bit error produced in the redundant bits may possibly be detected erroneously as the triple bit error. This can be explained by the fact that the redundant bits added to the data bits of the inverted polarity upon re-write operation are newly prepared by a SEC-DED code generator, whereby upon occurrence of the single bit error in the redundant bits, the latter may be prepared and stored in a memory with such polarity that the redundant bits read out from the memory contains the error which is detected as the single bit error by the SEC-DED circuit. In this case, the error is processed in terms of a triple bit error.

In case k redundant bits are added to n data bits, the probability of the redundant bits being processed as the single bit error is given by $k/(n+k)$. Further, the probability of the single bit error occurring in the redundant bits prepared in the memory device with erroneous polarity upon rewriting operation can be given by $\frac{1}{2}\cdot 1/(n+k)$. For example, in case $n=64$ bits and $k=8$ bits, the above probability is equal to $\frac{1}{2}\cdot 8/(64+8)=1/18$. In other words, notwithstanding the fact that the single bit error has been detected and corrected normally, signalling of a triple bit error is produced with the probability of 1/18, which means that the single bit error correcting function as imparted will be rendered meaningless. This problem will become more serious in the prior art system provided with the means for enhancing the reliability as recited above, since an erroneous error bit detection will further degrade the single bit error correcting capability, involving a great disadvantage.

Accordingly, an object of the present invention is to provide an error correction and detection system in which a Hamming code including data bits and redundant bits is employed and which is capable of detecting without fail the fact that an error detected in the Hamming code and subjected to correction has been erroneously corrected.

Another object of the invention is to provide an error correction and detection system which is immune to such a problem that a single bit error occurring in the redundant bits of the Hamming code might undesirably be processed as if a triple bit error was produced.

In carrying out the invention, there is provided SEC-DED code generating means which is adapted to produce an SEC-DED code including n data bits added with k redundant bits. Generation of the SEC-DED code is realized in accordance with Hamming's principle by adding the k redundant bits of a minimum value so that the expression (2) recited hereinbefore can be satisfied. The SEC-DED code constituted by the n data bits and the k redundant bits is written in a memory. The SEC-DED code read out from the memory is checked by error correcting and detecting means. This check is carried out also in accordance with Hamming's concept. That is, when an error is detected as a single bit error, the concerned bit is corrected. In the case where a double bit or multi-bit error is detected, a message is produced to the effect that the error of concern is a multi-bit error. In this connection, it should however be noted that there may be effected miscorrection when a triple bit error occurring in reality is erroneously detected as a single bit error and correction is made on the associated bit, as described hereinbefore. With a view to avoiding such an inconvenience, the invention teaches that a retrial process is executed in response to the detection of the single bit error in the aforementioned error correcting and detecting means. To this end, inverting means is provided for inverting the corrected data bits output from the error correcting and detecting means. The inverting means may generally be realized in hardware as an inverter. However, the inversion may alternatively be effected by resorting to the use of a program. In any case, the inverted data bits are supplied to the aforementioned SEC-DED code generating means and again added with k redundant bits to constitute a SEC-DED code which is then written in a memory. The SEC-DED code is subsequently read out from the memory and supplied to the aforementioned error correcting and detecting means. In this manner, the error correcting and detecting means is operative to detect and correct a single bit error contained in the SEC-DED code constituted by the inverted data bits added with the redundant bits and additionally to detect the double bit or multi-bit error. So far as no error is detected at this stage, it is assumed that the preceding detection and correction of the signal bit error has been correctly carried out. However, because the redundant bits to be added to the data bits are newly produced, there is involved a possibility that an error may be present in the redundant bits of the SEC-DED code, for example.

According to a feature of the invention, comparing means is provided for comparing at first the corrected data bits output from the aforesaid error correcting and detecting means with the corrected data bits output for the second time (i.e. upon retrial) therefrom. In this way, the data bits corrected by the correcting and detecting means and available before and after the retrial are compared with each other through the comparing means. The types of data bit comparison include a mutual comparison of the data bits which are inverted relative to the original data bits, a mutual comparison of the non-inverted data bits, comparison of the inverted data bits with the non-inverted one and so forth. For the comparing means, a simple Exclusive OR gate may be used. In the case of the first two aforementioned comparisons in which the data bits of the same state are compared with each other, coincidence between both data bits as found through the comparison will mean that these data bits have been properly corrected regardless of any possible detection of a single bit error in the redundant bits. On the other hand, when correction is correspondingly made on the basis of the false decision that a single bit error is present in the data bits although in reality the other three bits are erroneous, the state only of the single bit is inverted. Accordingly, when the states of all data bits are subsequently inverted, the three actually erroneous data bits will be again written in the memory with the state which is likely to involve error. Thus, no coincidence will result from the comparison between the data bits obtained from the error correcting and detecting means and the data bits of the inverted state available before being written in the memory. Such discrepancy as detected through the comparison thus allows the preceding correction to be detected as an erroneous correction, say a miscorrection.

In the case of the last mentioned comparison where the data bits of opposite states are mutually compared, the procedure to deal with the results of comparison is effected in the reversed manner.

In any case, the miscorrection is detected on the basis of the results obtained from the comparison through the comparing means.

In this way, according to the invention, not only the miscorrection such that the triple bit error occuring actually in the data bits has been processed as if it were a single bit error can be detected, but also the problem that a single bit error occurring in the redundant bits themselves is erroneously detected as a triple bit error can be solved in a satisfactory manner.

The invention is not restricted to the system in which an SEC-DED code is used and in which a single bit error is detected and corrected with double or more bit error being solely detected. More generally, the invention can be applied to systems where a Hamming Code is adopted and error occurring in less than m bits, inclusive, is detected and corrected, while more than (m+1) bits, inclusive, subjected to error are detected. In this case, the aforementioned SEC-DED code generating means is provided by the Hamming code generating means. To this end, a Hamming code is constituted by n original information (or data) bits added with k' redundant bits for error correction, wherein in order to attain the error detecting and correcting function for the bits in number less than m, inclusive, $2^{k'}$ combinations of codes made possible by adding k' bits has to be greater than $$\sum_{m=1}^{m} {}_{k'+n}C_m$$

where C is generally an abridgement of a "combination" and $k'+n^C{}_m$ represent the number of the combinations resulted when m is selected from (k+n). This is explained in detail in the prior art literature mentioned above. Expressed mathematically, the following conditions must be satisfied.

$$\sum_{m=1}^{m} {}_{k'+n}C_m + 1 \leq 2^{k'} \quad (3)$$

In order to attain the error detecting capability for the bits in number not smaller than (m+1) in addition to the error detecting and correcting function described just above, there is required additionally a single redundant bit. When the number of all the redundant bits is represented by k, then $k=k'+1$. Thus, the above expression (3) may be rewritten as follows:

$$\sum_{m=1}^{m} {}_{k-1+n}C_m + 1 \leq 2^{k-1} \quad (4)$$

By the way, it will be noted that the expressions (1) and (2) recited hereinbefore can be derived by substituting 1 for m in the expression (4), because the SEC-DED code is a Hamming code capable of correcting a single bit error and detecting a double bit error, as described hereinbefore.

An important aspect of the invention can be seen in a system using Hamming codes and capable of detecting and correcting error bits in number not greater than m while detecting error bits in number not smaller than (m+1), wherein miscorrection through erroneous detectin of less than m bit error for a more than (m+1) bit error can be detected with an improved reliability.

The above and other objects, features and advantages of the inventon will become more apparent from the following description, taken in conjunction with the accompanying drawings in which.

Figure 1:
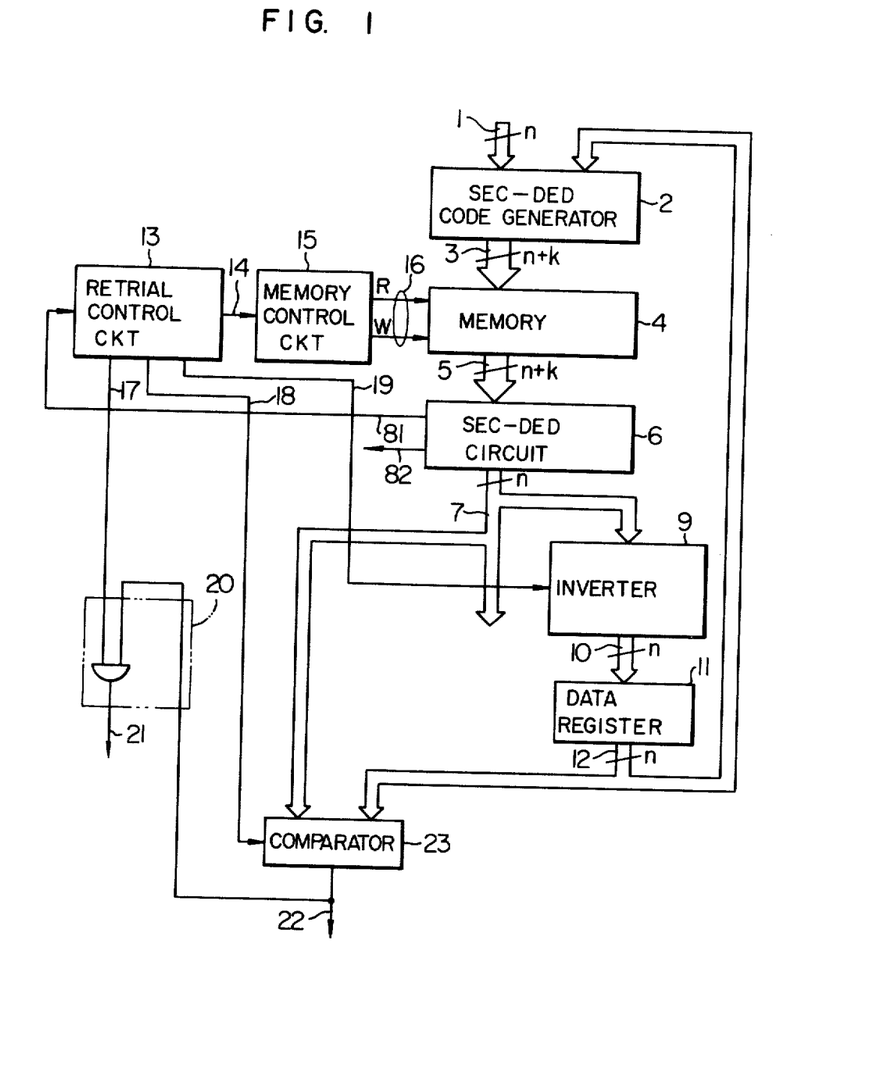
FIG. 1 is a block diagram to show a general arrangement of an error detection and correction system which is adapted to correct a single bit error and detect a double bit error in accordance with an embodiment of the present invention.

Referring to FIG. 1 showing an error detection and correction system using a Hamming code and adapted to correct a single bit error while detecting a double bit of multi-bit error according to an embodiment of the invention, a SEC-DED code generator circuit 2 is operative to add k redundant bits to n data bits of an input data to thereby produce an SEC-DED code. Generation of such an SEC-DED code can be effected in a known manner according to Hamming's principle so that the addition of the redundant bits may satisfy the conditions defined by the expression (2) recited hereinbefore. For example, when data is 64 bits (n=64), then 8 redundant bits (k=8) are required.

An SEC-DED code 3 constituted by n data bits and k redundant bits is written in a memory 4. The write-in operation of the SEC-DED code 3 as well as the read-out operation of a corresponding SEC-DED code 5 to and from the memory 4 is effected through a write-in/read-out drive line 16 activated under the control of a memory control circuit 15. The SEC-DED code 5 read out from the memory 4 is supplied to a SEC-DED circuit 6 which serves as the error correcting and detecting means and checks the SEC-DED code in accordance with Hamming's principle. When a single bit error is detected, a single bit error detection line 81 is energized, whereby the SEC-DED code 5 is output as a read out data after the concerned bit has been corrected. When an error is detected for more than two bits, inclusive, by the SEC-DED circuit 6, a multi-bit error detection line 82 is energized, whereby the detection of the multi-bit error is signalled outwardly.

It should be recalled that the invention concerns the processing for the detection of a single bit error. In other words, since there is involved a possibility that a triple bit error really occurring has been taken erroneously as a single bit error and correction has been made on such a false assumption, it is contemplated with the present invention to detect or identify such a miscorrection.

A retrail control circuit 13 is activated by the single bit error signal appearing on the single bit detection line 81 and is adapted to control steps of inverting the n data bits corrected by the SEC-DED circuit 6, and writing the inverted bit data again added with redundant bits in the memory 4 as rewritten in data for a repeated check. In the course of the retail processing a memory control line 14, a miscorrection detecting circuit control line 17, a comparison control line 12 and an inverter control line 19 are driven.

When the retrial control circuit 13 is driven by the single bit error detection line 81, the inverter control line 19 is simultaneously turned on, whereby the corrected n data bits are supplied to the inverter 9. The inverted data bits output from the inverter 9 are placed in a data register 11. The n inverted data bits produced from the data register 11 are supplied as rewritten data 12 to the SEC-DED code generator circuit 2 at which the n inverted data bits are added again to k redundant bits to constitute an SEC-DED code 3 which in turn is written again in the memory 4. The write-in and read-out operations of the SEC-DED code from and to the memory 4 at this time are effected under the control of the memory control circuit 15 which is operated by the memory control line 14 driven under the control of the retrial control circuit 13. The SEC-DED code 5 read out again from the memory 4 is checked again by the SEC-DED circuit 6. The check is made to the n inverted data bits and the k redundant bits. When it is detected as the result of the check that the error is a single bit error, the associated bit is corrected and output as the read-out data 7. In this case, the single bit detecting line 81 as driven is invalidated by the retrial control circuit 13. On the other hand, when a double bit error is detected through the above check, the multi-bit error detecting line 82 is driven. In this connection, it is to be noted that the data including more than a double bit error is output as the read-out data 7 without being corrected. In the retrial process now being described, the read-out data 7 is supplied to a comparator 23 independently of whether a single bit error or a double or more bit error has been detected. On the other hand, the data bits loaded in the data register 11 before the retrial process are also supplied to the comparator 23 at which the read-out data 7 as well as the data from the register 11 are compared with each other on a bit-by-bit base. In the retrial processing, the comparison control line 18 outgoing from the retrial control circuit 13 is activated. Thus, discrepancy in bits between both input data will cause a data discrepancy detecting line 22 to be activated. This detecting line 22 leads to a miscorrection detecting circuit 20 in parallel with the miscorrection detecting control line 17 described hereinbefore. Since a ignal is produced on the control line for the retrial process, a discrepancy in the comparison described above will result in the miscorrection detecting line 21 being turned on to signal outwardly the fact of miscorrection. On the other hand, coincidence found in the results of the comparison described above is interpreted to the effect that an error ascribable to a single bit error has been properly corrected, whereby the associated data before being compared is allowed to be subjected to various subsequent processing stages.

Next, description will be made of a concrete embodiment of operations of the system described above by referring to the following Table 1 on the assumption that data includes 64 data bits (A:60 bits, B:3 bits and C:1 bit) and the redundant bits are equal to 8 bits (D:7 bits and E:1 bit).

TABLE 1

| Items | | Case 1<br>C = Solid Single<br>Data Bit Error | Case 2<br>E = Solid Single<br>Redundant Bit<br>Error | Case 3<br>B = Solid Triple<br>Data Bit Error |
|---|---|---|---|---|
| First Time | Write-in Data | A + B + C | A + B + C | A + B + C |
| | Write-in SEC-DED code | A + B + C + D + E | A + B + C + D + E | A + $\underline{B}$ + C + D + E |
| | Read-out SEC-DED code | A + B + $\overline{C}$ + D + E | A + B + C + D + $\overline{E}$ | A + $\overline{B}$ + C + D + E |
| | line | ON | ON | ON |
| | Error bit position indicating information | C position | E position | C position |
| | Read-out data after correction | A + B + C (Normal correction) | A + B + C (Data is corrected) | A + $\overline{B}$ + $\overline{C}$ (Misconnection) |
| Second Time | Rewrite-in Data | $\overline{A} + \overline{B} + \overline{C}$ | $\overline{A} + \overline{B} + \overline{C}$ | $\overline{A}$ + B + C |
| | Rewritten SEC-DED code | $\overline{A} + \overline{B} + \overline{C}$ + D' + E' | $\overline{A} + \overline{B} + \overline{C}$ + D' + E | $\overline{A} + \underline{B}$ + C + D'' + E'' |
| | Read-out SEC-DED code | $\overline{A} + \overline{B} + \overline{C}$ + D' + E' | $\overline{A} + \overline{B} + \overline{C}$ + D + E | $\overline{A}$ + B + C + D + E |
| | Single bit error detecting line | OFF | ON | On |
| | Error bit position indicating information | none | E position | C position |
| | Data coincidence detecting line | ON | ON | OFF |
| | Read-out data after connection | $\overline{A} + \overline{B} + \overline{C}$ | $\overline{A} + \overline{B} + \overline{C}$ | $\overline{A} + \overline{B} + \overline{C}$ |

Remarks:
- Case 1: A: Data of 60 bits. B: Data of 3 bits. C: 1 bit data written C in memory and read out as $\overline{C}$. D,D': 7 redundant bits. E,E': 1 redundant bit.
- Case 2: A: Data of 60 bits. B: Data of 3 bits. C: Data of 1 bit. D,D': 7 redundant bits. E: 1 redundent bit written E in memory and read out as $\overline{E}$.
- Case 3: A: Data of 60 bits. B: 3 bits data written B in memory and read out as $\overline{B}$. C: Data of 1 bit. D,D'': 7 redundant bits. E,E'': 1 redundant bit.

Case 1

As can be seen from Table I, the exemplary case 1 is based on the assumption that although 8 redundant bits are normal in the memory 4, data including 64 data bits is subjected to a single bit error in that a single bit C of the 64 data bits as written in the memory with a bit C read out with the reverse bit $\overline{C}$. Under this circumstance, the SEC-DED circuit 6 will detect a single bit error with the aid of the 8 redundant bits (D+E) added at the SEC-DED code generating circuit 2, to thereby turn on the single bit error detecting line 81. Further, the error bit position is located and the concerned bit $\overline{C}$ is inverted to the normal value C.

As described hereinbefore in conjunction with FIG. 1, the retrial control circuit 13 is thereafter activated by the single bit error detecting line 81. Simultaneously, the read-out data 7 having undergone the correction is input to the inverter 9 which is activated through the inverter control line 19 outgoing from the retrial control circuit 13. Consequently, the read-out data 7 which has undergone the correction at the SEC-DED circuit 6 will be input to the data register 11 after the inversion and subsequently supplied again to the SEC-DED code generating circuit 2 as a rewrite-in data 12 which is represented by $\overline{A}+\overline{B}+\overline{C}$ as can be seen also from the Table 1. At the SEC-DED code generating circuit 2, this data is added to corresponding redundant bits (D'+E') to constitute a write-in SEC-DED code 3 of $\overline{A}+\overline{B}+\overline{C}+D'+E'$ which is output from the circuit 2. Under the control of the memory control line 14 outgoing from the retrial control circuit 13, the memory control circuit 15 is driven so that the above SEC-DED code 3 is written in the memory device 4 through the write-in/read-out line 16 now with the inverted stage $\overline{C}$ of the error bit. Since none of the bits A, B, D' and E' except the bit C will give rise to an error in memorization with either state, the SEC-DED code of $\overline{A}+\overline{B}+\overline{C}+D'+E'$ written in the memory 4 is now read out without being accompanied by any error and supplied to the input of the SEC-DED circuit 6 as the SEC-DED code 5. Since no error is detected at this time by the SEC-DED circuit 6, both of the single bit error detecting line 81 and the multi-bit error detecting line 82 remain in the off-state, while the error bit position designating information gives no designation of the bit position. It will be understood that such information is produced internally within the SEC-DED circuit 6 although it need not be produced outwardly. Consequently, the output from the SEC-DED circuit 6 is the read-out data 7 represented now by $\overline{A}+\overline{B}+\overline{C}$ which is then compared with the contents $\overline{A}+\overline{B}+\overline{C}$ placed in the data register 11 which holds the rewrite-in data 12 through the comparator 23 activated by the comparator control line 18 outgoing from the retrial control circuit 13. As a consequence, the discrepancy detecting line 22 indicating the discrepancy of comparison is turned off.

As will be appreciated from the foregoing description, when only a single bit error is present in reality, a comparison of the data portion through the comparator 23 executed after the retrial processing with the data state being inverted will result in coincidence without fail, whereby the data discrepancy detecting line is turned off.

Case 2

In the present exemplary case, it is assumed that 64 data bits are normally processed in the memory 4 while one bit E of 8 redundant bits written-in with one state E is read out with the inverted state $\overline{E}$, involving a single bit error which would be erroneously taken for a triple bit error in the case of the prior art system described hereinbefore. (In this connection, it should be mentioned here that the SEC-DED circuit will detect not only a single bit error of data but also a single bit error in the redundant bits). In this case, the SEC-DED circuit 6 will detect a single bit error and turn on the single bit error detecting line 81. Further, the error bit position is located, while it is detected that the value E inverted from the redundant bit $\overline{E}$ is a normal value. However, since no correction is made on the data bits (on the assumption that data contains no error), the read-out data 7 is represented by A+B+C. According to the invention, the read-out data 7 is input to the data register 11 after the state has been inverted by the inverter 9. The output from the data register 11 is supplied again to the SEC-DED code generating circuit 2 as the write-in data 12 for the retrial process. At that time, the inverter 9 as well as the memory 4 are controlled through the inverter control line 19 and the memory control line 14 outgoing from the retrial control circuit 13 in the same manner as described hereinbefore in conjunction with Case 1. The write-in data 12 for the retrial processing is represented by $\overline{A}+\overline{B}+\overline{C}$ as can be seen from the Table 1. At the SEC-DED code generating circuit 2, the data is added with corresponding redundant bits and output as an SEC-DED code. Because of the assumption that the bit E of the redundant bits as added is imparted with the state which gives rise to an error in the memory 4, the SEC-DEC code 3 in a form of $\overline{A}+\overline{B}+\overline{C}+D'+E$ written in the memory 4 will be read out therefrom as a read-out code 5 represented by $\overline{A}+\overline{B}+\overline{C}+D'+\overline{E}$ which will be then input to the SEC-DED circuit 6. It will be noted that the bit E of the redundant bits has undergone error while the bits A, B, C and D' are free of any error regardless of the state thereof. The SEC-DED circuit 6 will detect the single bit error and an erroneous bit position information indicates that an error has occurred at the bit position E of the redundant bits. It should be recalled that according to the prior art system described hereinbefore, the first correction made on the single bit error would be informed externally as a miscorrection, i.e. the first correction should have been made on a triple bit error, when error is again detected as the result of the retrial processing. However, according to the invention, since the read out data 7 from the SEC-DED circuit is $\overline{A}+\overline{B}+\overline{C}$ even if an error is detected by the SEC-DED circuit, comparison of this data with the contents $(\overline{A}+\overline{B}+\overline{C})$ of the data register 11 which holds the rewritein data 12 through the comparator 23 will result in coincidence, whereby the data discrepancy detecting line 22 is turned off. In this manner, a decision is made such that the error is a single bit error.

As will be appreciated from the foregoing description, a comparison made on the data portion of an SEC-DED code after the retrial processing according to the invention will always result in the detection of coincidence regardless of a single bit error in the redundant bits. Thus, the undesirable possibility that a single bit error might be interpreted as a triple bit error can be perfectly eliminated.

Case 3

In the present case, it is assumed that the three bits B of the 64 data bits are subjected to an error in the memory 4 in that the three bits B written in the memory 4 with one state are read out with the other state, i.e. with $\overline{B}$, while the correction of an error has been made erroneously on the single bit C nevertheless the fact that the error should have been detected as a triple bit error or multi-bit error. Under the circumstances, the SEC-DED circuit 6 will erroneously detect a single bit error due to the redundant bits as added in the SEC-DED code generating circuit 2, whereby the single bit error detecting line 81 is turned on. Further, the bit error position is erroneously detected as the bit position C, as the result of which the associated bit is inverted to $\overline{C}$. At that time, the three bits B which are in reality subjected to an error remain with the state $\overline{B}$. According to the invention, the read-out data 7 after the erroneous correction is input to the data register 11 after the inversion through the inverter 9, while the output from the data register 11 is again input to the SEC-DED code generating circuit 2 as the write-in data 12 for the retrial, as is shown in FIG. 1. At this time, the inverter 9 and the memory 4 are controlled by the inverter control line 19 and the memory control line 14 outgoing from the retrial control circuit 13 in the same manner as described hereinbefore in conjunction with the Case 1. The write-in data for the retrial is given by $\overline{A}+B+C$ as shown in the Table I. At the SEC-DED code generating circuit 2, this data is added with corresponding redundant bits (D''+E''), resulting in the generation of a SEC-DED code 3 in a form of $\overline{A}+B+C+D''+E''$. This code 3 is then written in the memory 4 in which the bits B undergo error in the sense that the bits B written in with the state B are read out with the other state $\overline{B}$. Since the other bits A, C, D'' and E'' give rise to no error with any state, the SEC-DED code written in the memory 4 is subjected to error at the bits B and read out as an SEC-DED code in a form of $\overline{A}+\overline{B}+C+D''+E''$. Since the read-out SEC-DED code 5 is still subjected to error in the three bits B which are detected as a single bit error, the SEC-DED circuit 6 supplied with the SEC-DED code 5 will again detect the single bit error of the bit C to invert to $\overline{C}$. Consequently, the read-out data 7 will become $\overline{A}+\overline{B}+\overline{C}$, which is then compared with the contents $\overline{A}+B+C$ of the data register 11 through the comparator 23, resulting in discrepancy between the data 7 and the contents of the register 11. Thus, the data discrepancy detecting line 22 is turned on, whereby the miscorrection detecting circuit 20 of a gate configuration as shown in FIG. 1 which has been validated by the miscorrection detecting circuit control line 17 outgoing from the retrial control circuit 13 is gated to turn on the miscorrection detecting line 21. In this manner, information is obtained such that the correction executed a first time on the single bit error is a miscorrection and should have been made on the triple bit error.

In the foregoing examples, It has been assumed that the error event in the memory is permanent or invariable. However, in practice, there may occur such an error event which differs from the first time detection to the second time detection. For example, when there are three bits which are likely to be erroneously processed and detected as a triple bit error at the first error detection, it may occur that they are detected as a double bit error at the second detection. In such a case, the present invention is effectively employed, because the miscorrection detecting circuit 20 will turn on the miscorrection detecting line 21 whenever a discrepancy is found in the comparison at the comparator 23 after the retrial processing.

According to another advantageous feature of the invention, a permanent error is not only detected but also can be corrected. As will be seen from the Table I, the SEC-DED code becomes $\overline{A}+\overline{B}+\overline{C}$ after the second time correction. Thus, by inverting the code, a permanent triple bit error can be corrected to the normal value. More particularly, even in the case of Case 3, the bits A are read out properly, inverted and written-in and then read out to be again iverted. Thus, the bits A remain invariable. On the other hand, since the bits B are erroneously read out, inverted, written-in and then read out erroneously, the correct polarity is imparted to the bits B. Finally, the bit C is read out correctly, inverted erroneously (miscorrection), inverted properly, written and then read out correctly, inverted erroneously (miscorrection) and again inverted. Thus, the bit C is ultimately imparted with a correct state.

It will be appreciated from the foregoing description that the problem that a single bit error occuring in the redundant bits might be processed as if it was a triple bit error is solved in a completely satisfactory manner.

Additionally, the problem of a triple bit error being erroneously processed as a single bit error to involve confusions in succeeding arithematic operation is also excluded. Besides, when the error event in a memory is solid, even the triple bit error can be properly corrected.

Figure 2:
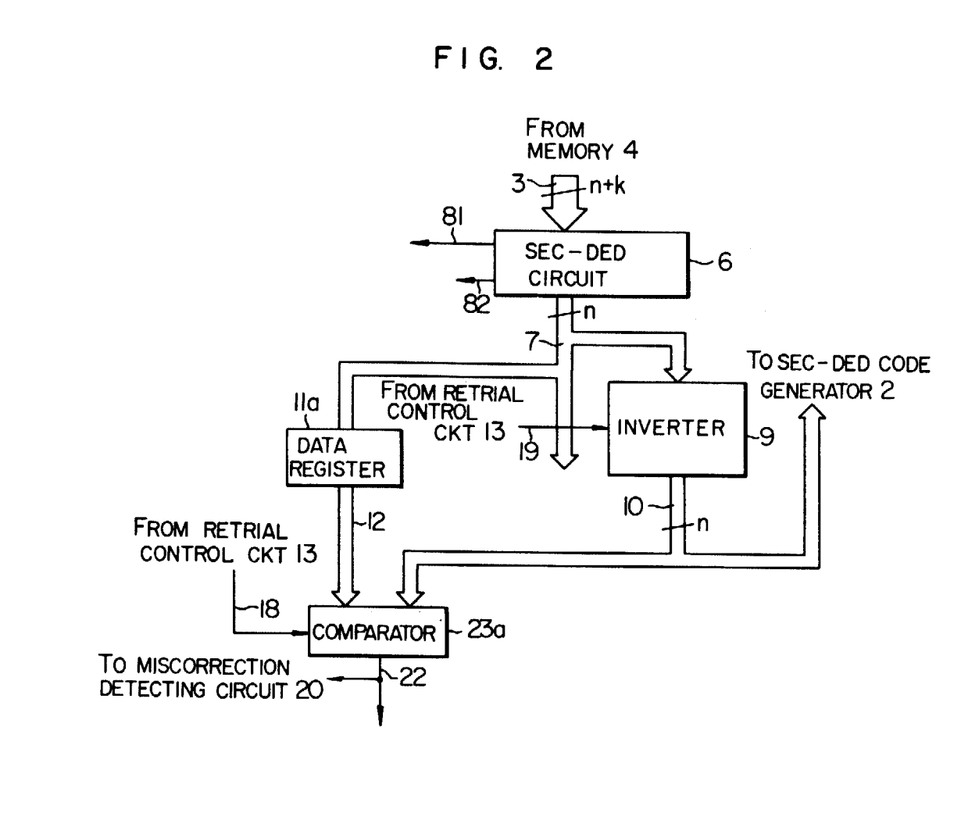
FIG. 2 is a block diagram to show partially a modificatin of the system shown in FIG. 1.

FIG. 2 shows a modification of the system shown in FIG. 1 and described above. Referring to FIG. 2, an SEC-DED code 3 read out from a memory 4 is checked by an SEC-DED circuit 6. When a single bit error is detected, the single bit error detecting line 81 is turned on to activate a retrial control circuit (not shown), whereby the retrial processing is initiated to correct the associated bit. A read-out corrected data 7 is then loaded in a data register 11a. At the same time, the corrected data is supplied also to an inverter 9, the output data from which is supplied to an SEC-DED code generating circuit 2 as a rewrite-in data 10 where the data 10 is again added with k redundant bits and written in the memory 4. The corresponding SEC-DED code read out again from the memory 4 is inverted and checked by the SEC-DED circuit in the similar manner as described above. The data output from the SEC-DED circuit is again supplied to the inverter 9. The data output from the inverter 9 thus regains the original state. This data is subsequently compared with the contents set in the data register 11a through a comparator 23a. The system shown in FIG. 2 differs from the one shown in FIG. 1 in that the data having non-inverted state are mutually compared in the case of the modification shown in FIG. 2. In this connection, it will be recalled that the data of the inverted state are compared with each other in the case of the system shown in FIG. 1. The other arrangement and operations of the modified system are similar to those described hereinbefore by referring to FIG. 1 and Table I or within the knowledge of those skilled in the art. Accordingly, further description will be unnecessary.

In the systems shown in FIGS. 1 and 2, it has been described that the data compared mutually through the comparator 23 or 23a have the same state. However, the invention is not restricted to such arrangement but may be carried out in the following manner. More specifically, in the case of the system shown in FIG. 2, one of the data to be compared by the comparator 23a is the data placed in the data register 11a, while the other is the corrected data output from the SEC-DED circuit 6 in the retrial processing and inverted by the inverter 9. In other words, both data to be mutually compared have the same state relative to the original state. In contrast thereto, the invention may be carried out in such a manner that the data set in the data register 11a is compared directly with the corrected data output from the SEC-DED circuit 6. Namely, since the latter data is not passed through the inverter 9, the comparison is made for the data having different states. Consequently, unless coincidence is found for all the data bits in the comparison, it is determined that the correction has been made normally, while a discrepancy even in a single bit will mean the detection of miscorrection.

At any rate, the systems shown in FIGS. 1 and 2 as well as the modification described just above are in common with one another in that the fact of miscorrection is detected in dependence on the results of data comparison realized by a comparator.

In the foregoing, description has been made on the assumption that a triple bit error has been processed in terms of a single bit error. However, it will be readily appreciated that the invention can be equally applied to the case where a multi-bit error containing an uneven number of error bits such as a 5-bit error, a 7-bit error and so forth has been processed as if it were a single bit error.

Further, in the case of the preceding examples, correction of a single bit error and detection of a double or more bit error have been described. However, it should be noted that the invention can be applied in more general terms to the correction of a m bit error (where m is an integer greater than 1) and the detection of a (m+1) bit error merely by increasing the number of the redundant bits as an increasing function of m. Of course, the number of the redundant bits as well as the checking process are determined in accordance with Hamming's principle on the basis of the expressions (1) to (4) recited hereinbefore.

The system according to the invention solves the problem of a single bit error of redundant bits being erroneously detected as a triple bit error while detection can be accomplished as to the miscorrection such that data error in more than three bits ascribable to memory function has been erroneously processed in terms of a single bit error. Thus, the invention allows the reliability of computer system to be enhanced significantly.

On the other hand, in carrying out the invention, a subsystem such as the one shown in FIG. 1 is required, which however can be implemented with the aid of a microprogram stored in a computer system without requiring addition of special hardware.

Further, because the inventive system is immune to the influences of variation in codes as employed, any kind of encoding method may be adopted.

So far as the error events in the memory is of a permanent nature, the invention allows not only the detection of a multi-bit error but correction thereof to be carried out. This advantage will become more significant when memory elements susceptible only to a permanent error are used for constituting a memory device. The invention is very effective in obtaining corrected values even when multi-bit errors have been produced in a memory equipment adopting conventional IC memories.

We claim:

1. An error correction and detection system for detecting and correcting, at most, an m-bit error and for detecting a greater than (m+1)-bit error where m≧1, using a Hamming code comprising:
   means for generating a Hamming code by adding a number of redundant bits to data bits;
   a memory for storing said Hamming code;
   error correcting and detecting means for checking the Hamming code read out from said memory, to thereby correct an error encompassing at most m bits, while detecting an error encompassing more than (m+1) bits;
   means for inverting the corrected data bits output from said error correcting and detecting means in response to the detection of said at most m bit error by said error correcting and detecting means;
   means for transferring said data bits, subsequent to said inversion, to said Hamming code generating means;
   a data register for temporarily storing said inverted data bits as first data bits;
   means for controlling said inverting means and said memory in response to the detection of said m-bit error in said error correcting and detecting means, to transfer the first data bits to said Hamming code generating means, to obtain output data bits as second data bits from said error correcting and detecting means;
   means for comparing said first data bits from said data register with said second data bits; and
   means for indicating a miscorrection which has been made by said error correcting and detecting means in response to the result of the comparison by said comparing means.

2. An error correction and detecting system as claimed in claim 1, wherein said transferring means is coupled with said data register.

3. An error correction and detecting system as claimed in claim 1, wherein said error correcting and detecting means is coupled with said controlling means by an error detecting line, with a signal being transferred to said controlling means through said error detecting line, to activate said controlling means in response to detection of said at most m bit error by said error correcting and detecting means.

4. An error correction and detecting system as claimed in claim 1, which further comprises indicating means having an AND gate coupled to receive a discrepancy signal from said comparing means and a miscorrection signal from said controlling means.

5. An error correction and detection system for detecting and correcting, at most, an m-bit error and for detecting a greater than (m+1)-bit error where m≧1, using a Hamming code comprising:
   means for generating a Hamming code by adding a number of redundant bits to data bits;
   a memory for storing said Hamming code:
   error correcting and detecting means for checking the Hamming code read out from said memory, to thereby correct an error encompassing at most m bits, while detecting an error encompassing more than (m+1) bits;
   means for inverting the corrected data bits output from said error correcting and detecting means in response to the detection of said at most m bit error by said error correcting and detecting means;
   means for transferring said data bits, subsequent to said inversion, to said Hamming code generating means;

a data register for temporarily storing said data bits output from said error correcting and detecting means as first data bits;

means for controlling said inverting means and said memory in response to the detection of said m-bit error in said error correcting and detecting means, to transfer the inverted data bits from said inverting means to said Hamming code generating means through said transferring means, to obtain output data bits through said inverting means as second data bits from said error correcting and detecting means;

means for comparing said first data bits from said data register with inverted second data bits through said inverting means; and means for indicating a miscorrection which has been made by said error correcting and detecting means in response to the result of the comparison by said comparing means.

6. An error correction and detecting system as claimed in claim 5, wherein said transferring means is coupled with said inverting means.

7. An apparatus for detecting a miscorrection in which a triple bit error has been erroneously corrected in terms of a single bit error in a system for detecting and correcting a single bit error while detecting a double or greater bit error comprising:

means for generating an SEC-DED code by adding k redundant bits to a n data bits, so that the condition that $2^{k-1} - (n+k) \geq 0$ is satisfied;

memory means for storing said SEC-DED code;

error correcting and detecting means for checking the SEC-DED code read out from said memory means to correct a single bit error and to detect a double or greater bit error;

inverting means for inverting the n data bits which have been corrected by said error correcting and detecting means;

a data register for temporarily storing the inverted data bits as first data bits;

means for controlling said inverting means and said memory in response to the detection of said single bit error in said error correcting and detecting means, to transfer the first data bits to said Hamming code generating means to obtain output data bits as second data bits from said error correcting and detecting means;

means for comparing said first data bits from said data register with said second data bits from said error correcting and detecting means; and miscorrection detecting means for detecting that a correction made on said single bit error by said error correcting and detecting means has been erroneously effected in response to the result of the comparison by said comparing means.

8. An apparatus for detecting a miscorrection in which a triple bit error has been erroneously corrected in terms of a single bit error in a system for detecting and correcting a single bit error while detecting a double or more bit error comprising:

means for generating an SEC-DED code by adding k redundant bits to n data bits, so that the condition that $2^{k-1} - (n+k) \geq 0$ is satisfied;

memory means for storing said SEC-DED code;

error correcting and detecting means for checking the SEC-DED code read out from said memory means, to correct a single bit error and detect a double or greater bit error;

inverting means for inverting the n data bits which have been corrected by said error correcting and detecting means;

a data register for temporarily storing the corrected data bits output from said error correcting and detecting means as first data bits;

means for controlling said inverting means and said memory, in response to the detection of said single bit error in said error correcting and detecting means, to transfer the inverted data bits from said inverting means to said Hamming code generating means through said transferring means, to obtain output data bits through said inverting means as second data bits from said error correcting and detecting means;

means for comparing said first data bits from said data register with said inverted second data bits through said inverting means; and miscorrection detecting means for detecting that a correction made on said single bit error by said error correcting and detecting means has been erroneously effected in response to the result of the comparison at said comparing means.

9. An apparatus for detecting a miscorrection in which a triple bit error has been erroneously corrected in terms of a single bit error in a system for detecting and correcting a single bit error while detecting a double or greater bit error comprising:

a SEC-DED code generating circuit for generating a SEC-DED code by adding k redundant bits to n data bits so that the condition that $2^{k-1} - (n+k) \geq 0$ is satisfied;

a memory for storing said SEC-DED code;

a memory control circuit for controlling write-in and read-out operations of said SEC-DED code with respect to said memory;

an error correcting and detecting circuit for checking an error in the SEC-DED code read out from aid memory, and correcting a single bit error, if detected, to thereby output only the n data bits corrected, while detecting a double or greater bit error, if present;

an inverter for inverting the corrected data output from said error correcting and detecting circuit;

a data register for storing temporarily the data bits output from said inverter as first data;

means for supplying the data bits output from said data register to said SEC-DED code generating circuit;

a comparator for comparing the first data bits from said data register with the second data bits from said an error correcting and detecting circuit;

a miscorrection detecting circuit for indicating that a miscorrection has occurred in response to a comparison discrepancy by said comparator; and a retrial control circuit for controlling said inverter, said comparator, said miscorrection detecting circuit and said memory control circuit, in response to the detection of said single bit error in said error correcting and detecting circuit and for supplying the inverted data bits in said data to said SEC-DED code generating circuit through said supplying means so as to obtain second data bits from said error correcting and detecting circuit.

10. A method of detecting a miscorrection in which a triple bit error has been erroneously corrected in terms of a single bit error in a system for detecting and correcting a single bit error while detecting a double or greater bit error comprising the steps of:

(a) generating a first SEC-DED code by adding k redundant bits to n data bits, so that the condition that $2^{k-1} - (n+k) \geq 0$ is satisfied;

(b) storing said SEC-DED code in a memory;

(c) checking the error in the SEC-DED code read out from the memory to correct a single bit error and to detect a double or greater bit error;

(d) inverting the n data bits after correcting the single bit error;

(e) holding temporarily the inverted data bits as first data bits;

(f) generating a second SEC-DED code by adding k redundant bits to the n inverted data bits;

(g) storing said second SEC-DED code in the memory;

(h) checking an error in the second SEC-DED code read out from the memory to correct a single bit error and to detect a double or greater bit error;

(i) comparing said first data bits with second data bits after correcting the single bit error in the second SEC-DED code; and (j) indicating a miscorrection which has been made at the first error correcting and detecting step (c) in response to the result of comparing step (i).

* * * * *